United States Patent [19]

Chang et al.

[11] 4,435,516

[45] Mar. 6, 1984

[54] ACTIVITY ENHANCEMENT OF HIGH SILICA ZEOLITES

[75] Inventors: Clarence D. Chang, Princeton; Joseph N. Miale, Lawrenceville, both of N.J.

[73] Assignee: Mobil Oil Corporation, New York, N.Y.

[21] Appl. No.: 317,037

[22] Filed: Nov. 2, 1981

[51] Int. Cl.$^3$ ............................................. B01J 29/28
[52] U.S. Cl. ........................................ 502/71; 502/77
[58] Field of Search ................................... 252/455 Z

[56] References Cited

U.S. PATENT DOCUMENTS 3,455,842 7/1969 Cornelius et al. ............... 252/455 Z
3,804,746 4/1974 Chu ...................................... 208/111
4,112,056 9/1978 Chen et al. ....................... 252/455 Z Primary Examiner—Carl F. Dees
Attorney, Agent, or Firm—Alexander J. McKillop; Michael G. Gilman; Charles J. Speciale

[57] ABSTRACT

A crystalline high silica-containing zeolite such as ZSM-5 is treated with an ammoniacal alkali metal aluminate so as to enhance the catalytic activity thereof.

8 Claims, No Drawings

ACTIVITY ENHANCEMENT OF HIGH SILICA ZEOLITES

CROSS REFERENCE TO RELATED CASES

This application is related to U.S. patent application Ser. No. 288,604, filed July 30, 1981 and now abandoned, entitled ACTIVITY ENHANCEMENT OF HIGH SILICA ZEOLITES of Pocken Chu.

BACKGROUND OF THE INVENTION

This invention relates to a method of enhancing the activity of high silica-containing crystalline materials by a process which involves contacting them with ammoniacal alkali metal aluminate solutions so as to cause the aluminium in the solution to become associated with the high silica-containing crystalline material and to enhance its activity.

High silica-containing zeolites are well known in the art and it is generally accepted that the ion exchange capacity of a crystalline aluminosilicate is directly dependent upon its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites having little or substantially no aluminum have many important properties and characteristics and a high degree of structural stability such that they have become candidates for use in various processes including catalytic processes. Materials of this type are known in the art and include high silica-containing aluminosilicates such as ZSM-5 (U.S. Pat. No. 3,702,886), ZSM-11 (U.S. Pat. No. 3,709,979), and zeolite ZSM-12 (U.S. Pat. No. 3,832,449) to mention a few.

The silica-to-alumina ratio of a given zeolite is often variable; for example, zeolite X can be synthesized with silica-to-alumina ratio of from 2 to 3; zeolite Y from 3 to about 6. In some zeolites, the upper limit of silica-to-alumina ratio was unbounded. ZSM-5 is one such example wherein the silica-to-alumina ratio is at least 5. U.S. Pat. No. 3,941,871 discloses a crystalline metal organosilicate essentially free of aluminum and exhibiting an x-ray diffraction pattern characteristic of ZSM-5 type aluminosilicates. U.S. Pat. Nos. 4,061,724; 4,073,865; and 4,104,294 describe microporous crystalline silicas or organosilicates wherein the aluminum content present is at impurity levels.

Because of the extremely low aluminum content of these silica-containing zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The novel process of this invention permits the preparation of high silica-containing materials which have all the desirable properties inherently possessed by such high silica materials and, yet, have an acid activity which heretofore has only been possible to be achieved by materials having a higher aluminum content.

DESCRIPTION OF THE PRIOR ART

It is to be immediately understood that there are many patents and technical articles relating to contacting crystalline aluminosilicate zeolites as well as high silica-containing materials having substantially no aluminum with solutions of aluminum ions in order to base exchange the aluminum for the cations originally associated with the crystalline materials. Additionally, there are many patents and technical articles wherein a high silica zeolite is incorporated into a matrix or binder wherein such processing also involves contacting said crystalline material with aluminum ions. Typical patents concerned with the above techniques would include some of the patents already mentioned, i.e. ZSM-5, ZSM-12, ZSM-11, as well as U.S. Pat. Nos. 3,140,329; 3,629,152; 3,429,830; 3,562,148; 3,582,497; 3,410,808; 3,403,110, merely to mention a few. The novel process of this invention is not concerned with an improved process for incorporating a crystalline material in a matrix nor is it concerned with a simple ion exchange process, but rather, it is concerned with a noval process for enhancing the acid activity of a crystalline material. In the prior art, previously referred to, there is no teaching of treatment of a crystalline material with an ammoniacal alkali metal aluminate solution in order to enhance the activity of a crystalline material.

In a copending application entitled ACTIVITY ENHANCEMENT OF HIGH SILICA ZEOLITES of Pochen Chu, filed July 30, 1981, Ser. No. 288,604, there is disclosed and claimed a process for enhancing the activity of high silica zeolites by contacting them with a solution containing both an alkali metal aluminate and a quaternary ammonium compound at a pH of at least 7 and most preferably 9-12. This invention represents an improvement in that expensive quaternary ammonium compounds are not needed and the procedure involves the use of common and relatively cheaper materials.

DESCRIPTION OF PREFERRED EMBODIMENTS

As has heretofore been stated, the novel process of this invention is concerned with the treatment of high silica containing crystalline material. The expression "high silica-containing crystalline material" is intended to define a crystalline structure which has a silica-to-alumina ratio greater than 500 and more preferably greater than 1000 up to and including those highly siliceous materials where the silica-to-alumina ratio is infinity or as reasonably close to infinity as practically possible. This latter group of highly siliceous materials is exemplified by U.S. Pat. Nos. 3,941,871; 4,061,724; 4,073,865; 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or alumina associated therewith, such as boron, iron and chromium, etc. Thus, the only requirement with regard to the starting materials utilized in a novel process of this invention, is that they have a silica-to-alumina ratio greater than about 500, irrespective of what other materials or metals are present in the crystal structure. The particularly preferred starting materials for the novel process of this invention are those crystalline materials which have an x-ray diffraction pattern characteristic of ZSM-5, ZSM-11, and ZSM-12 irrespective of their chemical composition other than the minimum silica-to-alumina ratio. The preferred starting material for the novel process of this invention is a high silica-containing ZSM-5.

The novel process of this invention is simple in nature and easy to carry out, although the results obtained therefrom are dramatic. The novel process of this invention is carried out simply by contacting a high silica-containing zeolite either as crystallized or after calcination with an ammoniacal alkali metal aluminate solution, preferably an ammoniacal sodium aluminate solution, at a pH of about 8 to 14 and, more preferably, a pH greater than 10. A particularly preferred technique involved contacting said high silica zeolite with said ammoniacal alkali metal aluminate solution by vacuum impregnation techniques.

The amount of solution utilized to treat the high silica-containing zeolites is not narrowly critical and the solution to zeolite ratio can vary from 0.3 to >10 grams of solution per gram of zeolite. The amount of solution will vary as a function of its concentration and the desired enhancement of activity.

The process is carried out by treating said high silica zeolite as crystallized or after calcination with the above described solution at temperatures ranging from 20° to 50° C. and preferably from 20° to 35° C. for periods of time ranging from 20 minutes to 30 days; preferably from ½ hour to 5 days.

Following the above treatment, the high silica-containing zeolite is processed into its catalytically active form by conventional techniques, such as base exchange with appropriate cations such as hydrogen, ammonium, rare earth, and mixtures thereof. The high silica-containing materials are then calcined by heating to a temperature in the range of 200°–600° C. in an atmosphere such as air, nitrogen, etc. and atmospheric, subatmospheric, or superatmospheric pressures for between about 1 and 48 hours. It is to be understood that the high silica-containing zeolites can, if desired, be incorporated in a matrix by techniques well known in the art. Conventional matrices include inorganic oxides, such as silica, alumina, silica alumina, etc. The following examples will illustrate the novel process of this invention.

EXAMPLE 1

A 2-g. sample of ZSM-5 zeolite having a silica-to-alumina ratio of about 26,000 and a sodium content of about 0.23 weight percent was impregnated with 3 grams of 5 weight percent sodium aluminate solution and calcined in air at 538° C. for 20 hours.

EXAMPLE 2

The product of Example 1 was treated with a 1-N 8 weight percent solution of ammonium nitrate.

EXAMPLE 3

A sample of the same ZSM-5 used above was vacuum impregnated with a solution of sodium aluminate which was diluted by an equal volume of concentrated (12N) NH$_4$OH. The pH was 12.4. After 30 minutes, the sample was dried and submitted to three cycles of 1N NH$_4$NO$_3$ treatment followed by hot water washing. The sample was dried and calcined at 538° C. prior to testing.

The products of Examples 1–3 were evaluated for alpha activity.

As is well known in the art, the alpha value gives an approximate indication of the catalytic cracking activity of the catalyst compared to a standard catalyst, and it is the relative rate constant of normal hexane conversion per unit volume of oxides per unit time. It is based on the activity of highly active silica-alumina cracking catalysts taken as an alpha of 1, and this test is described in U.S. Pat. No. 3,354,078 and the Journal of Catalysis, Vol. 4, pp. 522–529, Aug. 1965.

The results are shown in the following table:

TABLE 1

| Activity of High SiO$_2$ ZSM-5 After Treatment | | |
|---|---|---|
| Example | | Alpha |
| 1 | NaAlO$_2$ treat | 0.4 |
| 2 | NaAlO$_2$/NH$_4$NO$_3$ treat | 0.2 |
| 3 | NaAlO$_2$/NH$_4$OH imp + NH$_4$NO$_3$ treat | 12 |

From the above table, it can be seen that the noval process of this invention resulted in a dramatic increase of activity. The procedure of Examples 1 and 2 did not result in any significant improvement, whereas the process of this invention (Example 3) did enhance activity.

What is claimed is:

1. A method for enhancing the activity of a high silica-containing crystalline zeolite having a silica-to-alumina ratio greater than 500 which comprises contacting said material with an ammoniacal solution of an alkali metal aluminate for a period of time ranging from ½ hour to 5 days at a temperature of from 20° to 50° C. and at a pH of at least 10.

2. The process of claim 1 wherein the alkali metal aluminate is sodium aluminate.

3. A method of enhancing the activity of a high silica zeolite of the ZSM-5 type having a silica-to-alumina ratio of at least 500 which comprises contacting said zeolite with an ammoniacal solution of an alkali metal aluminate at a temperature of from 20° to 50° C., for a period of time ranging from ½ day to 5 days and at a pH of at least 10.

4. The process of claim 3 wherein the alkali metal aluminate is sodium aluminate.

5. The process of claim 4 wherein the ZSM-5 zeolite has a silica-to-alumina ratio in excess of 500.

6. The process of claim 4 wherein the ZSM-5 zeolite has a silica-to-alumina ration in excess of 1600.

7. The process of claim 4 wherein the ZSM-5 zeolite has a silica-to-alumina ratio approaching infinity.

8. The process of claim 3 wherein the ammoniacal alkali metal aluminate is applied by vacuum impregnation.

* * * * *

UNITED STATES PATENT AND TRADEMARK OFFICE
CERTIFICATE OF CORRECTION

PATENT NO. : 4,435,516

DATED : March 6, 1984

INVENTOR(S) : Clarence D. Chang and Joseph N. Miale

It is certified that error appears in the above-identified patent and that said Letters Patent is hereby corrected as shown below:

Column 3 line 17 "0.3 to > 10 grams" should be --0.3 to < 10 grams--.

Signed and Sealed this

Fourteenth Day of August 1984

[SEAL]

Attest:

GERALD J. MOSSINGHOFF

Attesting Officer

Commissioner of Patents and Trademarks